Aug. 30, 1966    A. SABATIUK    3,269,120
GAS TURBINE ENGINE WITH COMPRESSOR AND TURBINE
PASSAGES IN A SINGLE ROTOR ELEMENT
Filed July 16, 1964    2 Sheets-Sheet 1
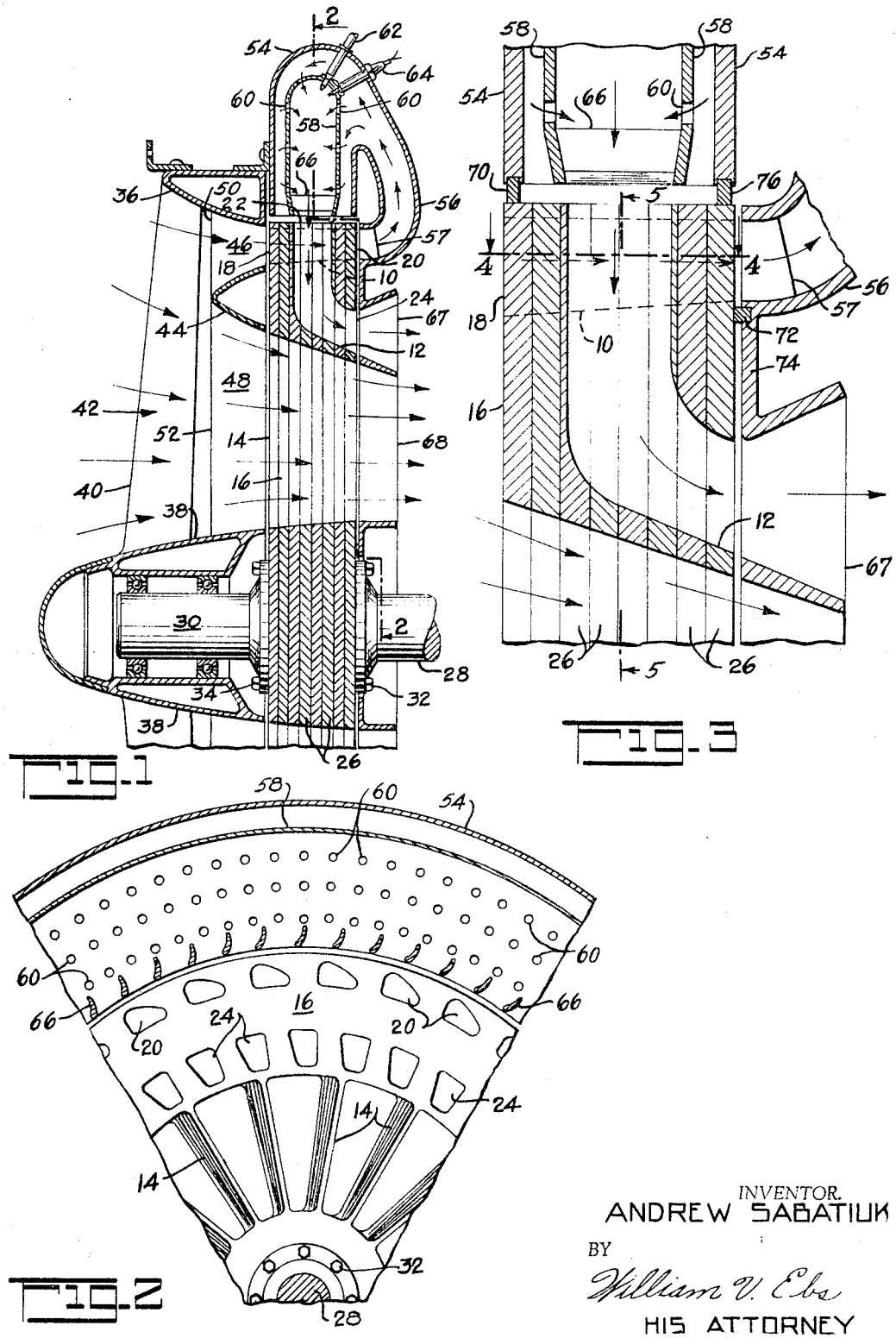
INVENTOR.
ANDREW SABATIUK
BY
William V. Ebs
HIS ATTORNEY Aug. 30, 1966
A. SABATIUK
3,269,120
GAS TURBINE ENGINE WITH COMPRESSOR AND TURBINE
PASSAGES IN A SINGLE ROTOR ELEMENT
Filed July 16, 1964
2 Sheets-Sheet 2
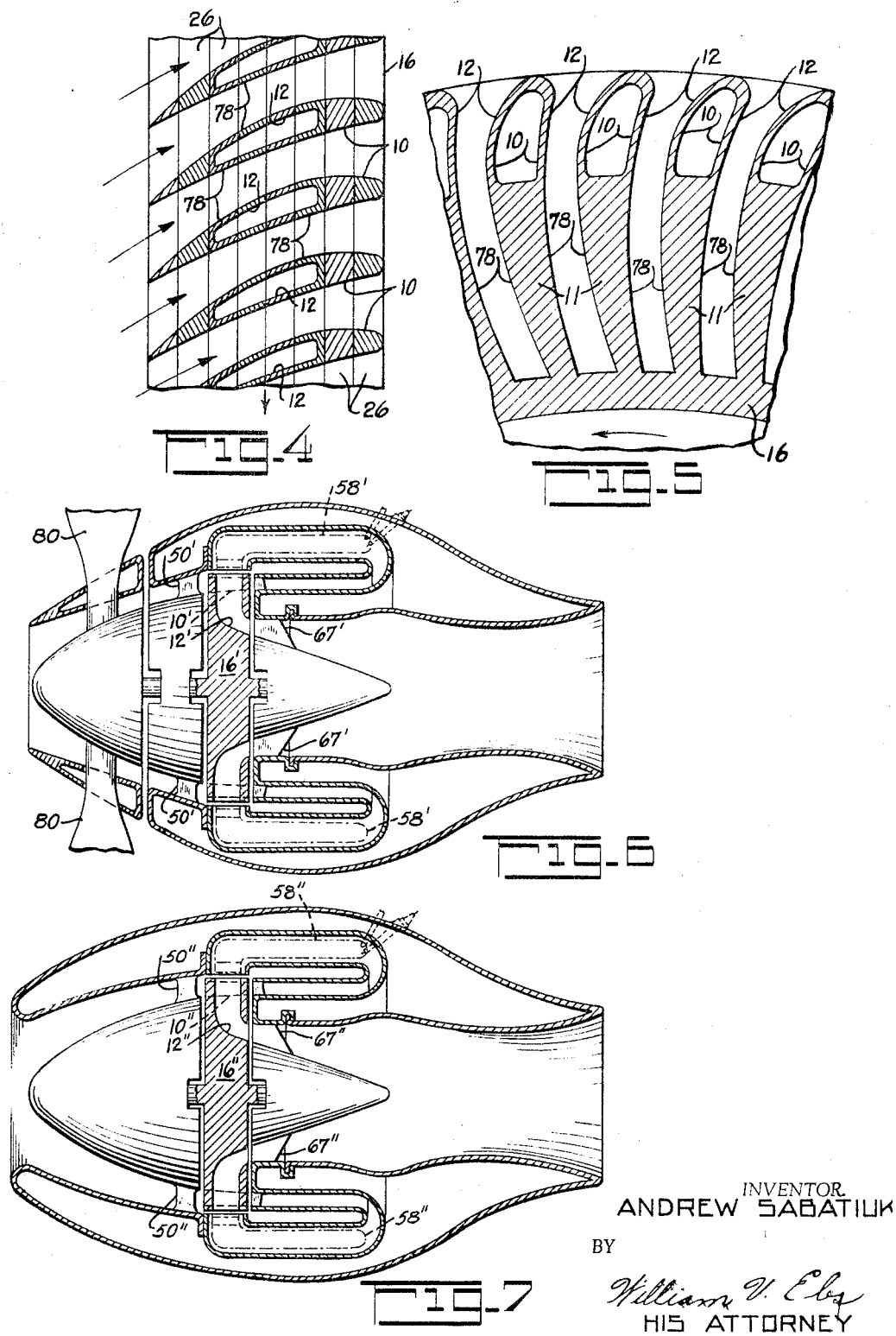
INVENTOR.
ANDREW SABATIUK
BY
William V. Eby
HIS ATTORNEY

United States Patent Office 3,269,120
Patented August 30, 1966

3,269,120
GAS TURBINE ENGINE WITH COMPRESSOR AND TURBINE PASSAGES IN A SINGLE ROTOR ELEMENT
Andrew Sabatiuk, Mountain Lakes, N.J., assignor to Curtiss-Wright Corporation, a corporation of Delaware
Filed July 16, 1964, Ser. No. 383,092
6 Claims. (Cl. 60—39.43)

My invention relates to gas turbine engines and in particular is directed to a gas turbine engine having axial flow compressor passages and radial flow turbine passages in a single rotor element.

Gas turbine engines have been improved over the years by the use of new materials and new fabrication technology, and by the use of more efficient thermodynamic cycles. Conventional gas turbine engines are, however, still costly to fabricate and maximum performance is not achieved because of the limitations imposed upon operating temperatures by structural and metallurgical considerations. Current research and development programs aimed at the structural and metallurgical problems may further improve the performance of the conventional gas turbine engine but resulting improvements are likely to be realized only in small steps and can be expected to materially add to the cost of the engine. What is needed is a new type of gas turbine engine based upon a design concept capable of providing a low cost power plant with the significant improvements required for advanced STOL, VTOL and conventional aircraft. It is the primary object of this invention to provide such an engine.

It is another object of the invention to provide a gas turbine engine having compressor and turbine passages on a single rotor element.

It is still another object of the invention to provide a gas turbine engine in which turbine inlet temperatures can be significantly increased over those used in conventional gas turbine engines.

It is yet another object of the invention to provide a gas turbine engine in which walls forming turbine passages in the engine are cooled on outside surfaces by compressor air flow.

It is a further object of the invention to provide a gas turbine engine having an axial flow compressor and radial flow turbine in substantially the same transverse plane.

Another object of the invention is to provide a gas turbine engine having axial flow compressor passages and radial in-flow turbine passages on a single rotor in substantially the same transverse plane.

Still another object of the invention is to provide a gas turbine engine having axial flow compressor passages and radial in-flow turbine passages on a single rotor in substantially the same plane as combustion chamber means for supplying hot gases to the turbine passages.

Yet another object of the invention is to provide a lightweight, high power output engine which can be made quite flat for convenient installation as in the wing of a VTOL aircraft.

A further object of the invention is to provide a gas turbine engine having a single rotor element which includes compressor passages, turbine passages, and fan blades located radially inward from the compressor and turbine passages.

Other objects and advantages of the invention will become apparent during a reading of the specification taken in connection with the accompanying drawings in which:

FIG. 1 is a longitudinal sectional view showing one-half of a lift fan engine embodying the features of the invention;

FIG. 2 is a view taken on the plane of the line 2—2 of FIG. 1;

FIG. 3 is an enlarged fragmentary longitudinal sectional view of the engine of FIG. 1 showing a portion of the rotor and associated other parts;

FIG. 4 is a developed sectional view taken on the line 4—4 of FIG. 3;

FIG. 5 is a sectional view taken on the plane of the line 5—5 of FIG. 3;

FIG. 6 is a longitudinal sectional view showing a turboprop engine constructed in accordance with the invention; and FIG. 7 is a similar view showing a turbojet engine constructed according to the invention.

The engine of FIGS. 1–5 is a relatively flat gas turbine engine particularly suitable for use in VTOL aircraft. It is an engine having compressor passages 10 and turbine passages 12, as well as fan blades 14 for generating propulsive forces, all on a single rotor element 16. The compressor passages 10 which have inlet openings 18 in one face of the rotor and exit openings 20 in the opposite end face extend through hollow portions of generally radially extending rotor vanes 11, the exterior surfaces of which define the turbine passages 12. The turbine passages 12 have inlet openings 22 in the periphery of the rotor and exit openings 24 in the rotor end face which includes the compressor exit openings. Flow through the compressor passages 10 is in a direction generally parallel to the axis of the rotor element 16, and flow through the turbine passages 12 is in a more or less radial direction at least for a portion of the length of the passages.

The rotor element 16 can be fabricated as a unit as by casting and machining, or it can be constructed as illustrated in FIGS. 1–5, that is from a plurality of transverse laminations 26 each with holes extending through it and so located that when the laminations are properly indexed, the axial flow compressor passages 10, radial flow turbine passages 12 and the fan blades 14 result. The laminations may be assembled in indexed positions to shafting in any suitable manner to the engine shaft portions 28 and 30 by the bolts 32 and 34. Surface smoothness for the passages and fan blades may be obtained by hand grinding or grit blasting. Constructing the rotor of laminations facilitates interweaving the compressor and turbine passages in the rotor element, and eliminates the need for highly specialized tooling that would otherwise have to be developed to machine and finish the passages and fan blades. With the laminate construction only conventional techniques need be used to fabricate the rotor. Homogeneity of material strength and weight distribution is also more easily assured because of the greater ability to inspect thin materials, whether this be sheet stock, pancake forgings or thin castings.

Fairing structures 36 and 38 at the outer and inner ends of radial struts 40 define the engine inlet 42. The inlet 42 is divided by fairing 44 into concentric portions 46 and 48 adjacent the inlet openings of the compressor passages and the fan blades respectively. Fairing 44 is supported by inlet guide vanes of airfoil configuration, namely vanes 50 for directing inlet air to the compressor passages at the design angle and by the vanes 52 also of airfoil configuration for directing air to the fan blades 14 in the desired manner.

The rotor element 16 is surrounded by an annular shroud 54 which connects by means of ducting 56 with the compressor passages at their exit end. Compressor stator vanes 57 for directing exit air from the compressor are provided in the ducting 56 adjacent the exit openings of the compressor passages as shown. Within the shroud 54 is an annular combustor 58. Air from the compressor passages 10 passes through the ducting 56 into the shroud 54 and thence through openings 60 in the combustor shell to the interior of the combustor where it is mixed with fuel supplied through nozzle 62 and ignited by spark plug 64. Combustion gases are discharged from the combustor 58 through nozzles 66 located at the exit end thereof. The discharged gases enter the turbine passages 12 and react upon the walls to produce rotation of rotor element 16.

In certain instances depending upon turbine inlet design conditions, it might be deemed necessary to cool the turbine nozzles. Such cooling might be readily accomplished as by constructing the nozzles as hollow members and passing the fuel through the nozzles before its discharge into the combustor. The nozzles in addition to serving their primary function would then also serve as a vaporizer for the fuel. The combustor 58 can be constructed to provide a single undivided combustion chamber as shown, or a number of circumferentially spaced walls may be included to provide plural chambers. In the event partitioning walls are included, they might be constructed as hollow members in the manner of the turbine nozzles and cooled in the same fashion by fuel on its way to the injection nozzle 62.

Turbine stator blades 67 are provided adjacent the exit openings 24 of the turbine passages, and the combustion gases flowing through the turbine pass through the stator blades to exhaust therefrom in a direction substantially parallel to the axis of the rotor element 16. Guide vanes 68 of airfoil configuration adjacent the exit end of the fan blades 14 provide for discharge of the air to which momentum is imparted by the blades in a direction which is also parallel to the axis of element 16.

In order to prevent leakage which would tend to bring about a deterioration in engine performance, seals are provided at selected points between the rotor element 16 and adjacent stationary parts. An annular seal 70 between the rotor element 16 and shroud 54 (see FIG. 3) prevents combustion gases from leaking around the periphery of the rotor element and into the inlet openings 18 of the compressor passages 10. An annular seal 72 between the rotor element 16 and the adjacent annular wall 74 separating ducting 56 and the turbine stator blades 67 blocks the leakage flow of compressor air over the end face of the rotor into the turbine exhaust gas flow. Combustion gases are isolated from compressor air flowing from the exit end of the compressor passages by annular seal 76 between the shroud 54 and the rotor element.

Higher turbine inlet temperature can be tolerated in the described engine than in conventional gas turbine engines for a number of reasons. One reason is that the combustion gases enter the turbine passages 12 at the periphery of the rotor element and are cooled to some extent before they reach high stress areas at the radially inner ends of the walls 78 defining the passages. This is in contrast to conventionally designed gas turbine engines wherein the combustion gases flow axially between the turbine blades. Another reason is that the walls 78 defining the turbine passages are cooled by the total compressor air flow. Also, the compressor air flows by the walls 78 near the periphery of the rotor element where the turbine gases are at their highest temperature. There is therefore an especially high transfer of heat to the compressor air and metal temperatures are maintained quite low. In addition, the air passing through the fan serves to cool the rotor element.

The axial length of the engine of FIGS. 1–5 is reduced to a minimum by having the compressor passages, turbine passages and fan blades all on a single rotor element. The engine can therefore be accommodated in a very limited space. It can, for example, be conveniently installed in the wing of a VTOL aircraft and used to provide power and thrust for the vehicle.

Instead of providing fan blades on the rotor element containing the compressor and turbine passages as in the engine of FIGS. 1–5, propeller blades rotatable with the rotor element, but axially displaced from it may be provided and thrust obtained from such blades and reaction forces from the exhaust gas jet as in the turboprop engine of FIG. 6, or thrust may be obtained entirely from the exhaust gas jet without additional thrust producing means as in the jet engine of FIG. 7. Aside from the elimination of the fan blades in the engines of FIGS. 6 and 7, and the addition of propeller blades 80 in the engine of FIG. 6, such engines are generally similar to the engines of FIGS. 1–5 and corresponding parts of all three engines are designated by like reference characters in the drawings but with a prime mark (′) added to the reference characters of FIG. 6 and a double prime mark (″) added to the reference characters of FIG. 7.

In each of the engines of FIGS. 6 and 7 a single rotor element (16′ in FIG. 6 and 16″ in FIG. 7) includes both compressor and turbine passages. Air enters the compressor passages 10′ of rotor 16′ through inlet guide vanes 50′ and compressor passages 10″ of rotor 16″ through inlet guide vanes 50″. From the compressor passages 10′ and 10″ the air passes through ducting into the combustors 58′ and 58″ respectively. Combustion gases from the combustor 58′ flow into the turbine passages 12′ of the rotor element 16′ of the engine shown in FIG. 6 and combustion gases from combustor 58″ flow into the turbine passages 12″ of the rotor element 16″ of the engine shown in FIG. 7. From the turbine passages the gases exhaust through stator vanes 67′ (FIG. 6) and 67″ (FIG. 7). It is apparent then that the flow of air for combustion and of combustion gases in the engines of FIG. 6 and 7 corresponds to that in the engine of FIG. 5. Although the engines of FIGS. 6 and 7 are shown as having one-piece rotor elements 16′ and 16″, such elements may be constructed from laminations in the manner described for the rotor element 16 of the engine of FIG. 5.

Other engine configurations embodying the idea of having compressor and turbine passages on a single rotor element are also possible. For example, the rotor of the engine of FIG. 6 might be used to drive merely accessories rather than the propeller blades 80 to thereby provide a turboshaft engine, or the propeller blades 80 might be replaced by fan blades and ducting provided to carry by-pass air around the gas generator into the exhaust gas flow to form a ducted fan engine. In a single ducted fan engine reduction gears would have to be provided between the rotor element and the fan since the rotational speed of the turbine would be too great to drive the fan directly. A reduction gear would normally also be provided between the rotor element and propeller blades in a single spool turboprop engine such as shown in FIG. 6. In a twin spool engine, reduction gearing might be eliminated and the fan blade or propeller blade driven from the free spool (a spool including turbine passages but no compressor passages).

In the various engine configurations shown, the proximity of the flow of compressor exit air and the turbine exhaust facilitates the use of a regeneration system for improving specific fuel consumption in the engine. In the illustrated engines and other engine configurations embodying the invention, different types of regeneration systems wherein the temperature of the compressor exit flow is raised in a heat exchanger by heat from exhaust gases, and different arrangements of components of the system might be employed.

It will be apparent to those skilled in the art that the engines shown and described are by no means exhaustive. It will be appreciated, for example, that it is possible to have compressor air flow axially through the rotor in a direction opposite to that shown in the illustrations provided the compressor passages are suitably modified for the purpose. Sometimes air for combustion can be more readily supplied to the compressor at the end of the rotor from which the turbine gases exhaust and under this circumstance such an arrangement is the preferable one. Various other changes and modifications may be made in the arrangements shown by one skilled in the art without departing from the spirit and scope of the inven-

I claim:

1. A gas turbine engine comprising a rotor which includes axial flow compressor passages, radial flow turbine passages, and fan blades located radially inwardly from the compressor and turbine passages; a combustor radially outward from the rotor for supplying hot gases to the turbine passages; and means for supplying air for combustion from the said compressor passages to the combustor; the compressor and turbine passages, the fan blades and the combustor all lying in a common plane perpendicular to the rotor axis.

2. A gas turbine engine comprising a rotor which includes a set of compressor passages and a set of turbine passages, one of the said sets being axial flow passages and the other set being radial flow passages; air inlet means connected with the compressor passages at one end thereof, a combustor connected with the other end of the compressor passages, the combustor also being connected with the turbine passages at one end for the purpose of supplying hot gases thereto; exhaust means connected with the other end of the turbine passages; and fan blades located radially inwardly from the compressor and turbine passages, the compressor and turbine passages, the fan blades and the combustor all lying in a common plane perpendicular to the rotor axis.

3. A gas turbine engine as defined in claim 1 wherein the axial flow compressor passages have inlet openings at one end of the rotor and exit openings at the opposite end, and the radial flow turbine passages have inlet openings in the periphery of the rotor and exit openings at the said opposite end located radially inward from the exit openings of the compressor passages.

4. A gas turbine engine as defined in claim 1 wherein the rotor comprises a plurality of laminations assembled side by side in fixed positions relative to each other for rotation about a common axis; each of the laminations including two radially spaced sets of holes extending therethrough between opposite sides and a set of slots extending inwardly from the periphery of the rotor, said laminations being indexed in a rotational sense whereby the radially outer sets of holes define the compressor passages, the radially inner sets of holes define the fan blades, and the slots define the turbine passages.

5. A gas turbine engine comprising a rotor which includes a set of generally radially extending vanes having hollow interior portions which form curved axial flow compressor passages and the exterior surfaces of which define curved radial turbine passages, a combustor for supplying hot gases flowing radially inwardly through said turbine passages, and means for supplying air for combustion from the said compressor passages to the combustor.

6. A gas turbine engine as defined in claim 5 wherein the combustor is located radially outwardly from said vanes and the vanes and combustor lie in a common plane perpendicular to the rotor axis.

References Cited by the Examiner

UNITED STATES PATENTS

| | | | |
|---|---|---|---|
| 612,815 | 10/1898 | Bright | 253—77.3 |
| 1,181,479 | 5/1916 | Resch | 60—39.44 |
| 1,603,966 | 10/1926 | Lorenzen | 253—77 |
| 2,397,999 | 4/1946 | Goddard | 60—35.6 |
| 2,611,241 | 9/1952 | Schulz | 60—39.36 |
| 2,694,291 | 11/1954 | Rosengart | 60—39.36 |
| 2,803,945 | 8/1957 | Staaf | 60—39.36 |
| 3,037,742 | 6/1962 | Dent | 253—77 |

FOREIGN PATENTS 986,707   4/1951   France.

MARK NEWMAN, *Primary Examiner.*

RALPH D. BLAKESLEE, *Assistant Examiner.*